United States Patent
Kurehashi et al.

(10) Patent No.: US 11,842,643 B2
(45) Date of Patent: Dec. 12, 2023

(54) COMMUNICATION CONTROL APPARATUS, VEHICLE, COMPUTER-READABLE STORAGE MEDIUM, AND COMMUNICATION CONTROL METHOD

(71) Applicant: HONDA MOTOR CO., LTD., Tokyo (JP)

(72) Inventors: Takahiro Kurehashi, Saitama (JP); Shigeru Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 17/472,685

(22) Filed: Sep. 12, 2021

(65) Prior Publication Data
US 2022/0084410 A1    Mar. 17, 2022

(30) Foreign Application Priority Data
Sep. 15, 2020    (JP) .................. 2020-154859

(51) Int. Cl.
   *G08G 1/16*    (2006.01)
   *G06V 20/58*   (2022.01)

(52) U.S. Cl.
   CPC .......... *G08G 1/166* (2013.01); *G06V 20/58* (2022.01)

(58) Field of Classification Search
   CPC ........ G08G 1/166; G08G 1/161; G08G 1/005; G06V 20/58; G06K 90/00805
   See application file for complete search history.

(56) References Cited

U.S. PATENT DOCUMENTS

| | | | |
|---|---|---|---|
| 9,953,538 B1* | 4/2018 | Matthiesen | B60Q 1/346 |
| 2010/0099353 A1 | 4/2010 | Komori | |
| 2017/0240185 A1* | 8/2017 | Li | G08B 7/06 |

(Continued)

FOREIGN PATENT DOCUMENTS

| | | |
|---|---|---|
| CN | 110519555 A | 11/2019 |
| CN | 110827560 A | 2/2020 |

(Continued)

OTHER PUBLICATIONS

Office Action issued for counterpart Chinese Application 202110902107.5, issued by The State Intellectual Property Office of People's Republic of China dated Jun. 1, 2023.

(Continued)

*Primary Examiner* — Sisay Yacob

(57) ABSTRACT

A communication control apparatus includes an image acquisition unit configured to acquire an image captured by an image capturing unit installed in a movable object. The communication control apparatus includes a detection unit configured to detect a risk area from the image. The communication control apparatus includes a calculation unit configured to calculate location information of the risk area. The communication control apparatus includes a transmission control unit configured to control transmission of risk area information including the location information. The communication control apparatus includes a reception control unit configured to control reception of a response to the risk area information. The communication control apparatus includes an output control unit configured to control output of notification information based on the response.

23 Claims, 7 Drawing Sheets

(56) References Cited

U.S. PATENT DOCUMENTS

| | | | | |
|---|---|---|---|---|
| 2018/0033306 A1* | 2/2018 | Kim | .................... | G06V 40/103 |
| 2018/0302752 A1* | 10/2018 | Ueno | ...................... | H04W 4/80 |
| 2019/0364248 A1 | 11/2019 | Katayama | | |
| 2020/0051427 A1 | 2/2020 | Katayama | | |
| 2020/0066150 A1 | 2/2020 | Katayama | | |
| 2020/0247404 A1 | 8/2020 | Ohe | | |
| 2021/0350706 A1* | 11/2021 | Yoshitake | .............. | G08G 1/167 |
| 2022/0026567 A1* | 1/2022 | Yoshitake | ............. | G01S 13/931 |

FOREIGN PATENT DOCUMENTS

| | | |
|---|---|---|
| CN | 110853361 A | 2/2020 |
| CN | 111524359 A | 8/2020 |
| JP | 2007223517 A | 9/2007 |
| JP | 2008225572 A | 9/2008 |
| JP | 2008225786 A | 9/2008 |
| JP | 2008299676 A | 12/2008 |
| WO | 2020070909 A1 | 4/2020 |

OTHER PUBLICATIONS

Office Action issued for counterpart Japanese Application 2020-154859, issued by Japanese Patent Office dated Oct. 3, 2023 (drafted on Sep. 26, 2023).

* cited by examiner

COMMUNICATION CONTROL APPARATUS, VEHICLE, COMPUTER-READABLE STORAGE MEDIUM, AND COMMUNICATION CONTROL METHOD The contents of the following Japanese patent application are incorporated herein by reference:

Japanese Patent Application NO. 2020-154859 filed on Sep. 15, 2020.

BACKGROUND

1. Technical Field

The present invention relates to a communication control apparatus, a vehicle, a computer-readable storage medium, and a communication control method.

2. Related Art

Patent document 1 describes a pedestrian detection apparatus that determines whether to request a pedestrian terminal for location information based on a reception situation of radio waves from the pedestrian terminal. Patent document 2 describes a hand free system for vehicles which judges safety of a hand free call at the time of driving based on traveling information of its own vehicle or environment information outside the vehicle.

LIST OF CITED REFERENCES

Patent Documents

[Patent document 1] Japanese Unexamined Patent Application, Publication No. 2008-225572
[Patent document 2] Japanese Unexamined Patent Application, Publication No. 2007-223517

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
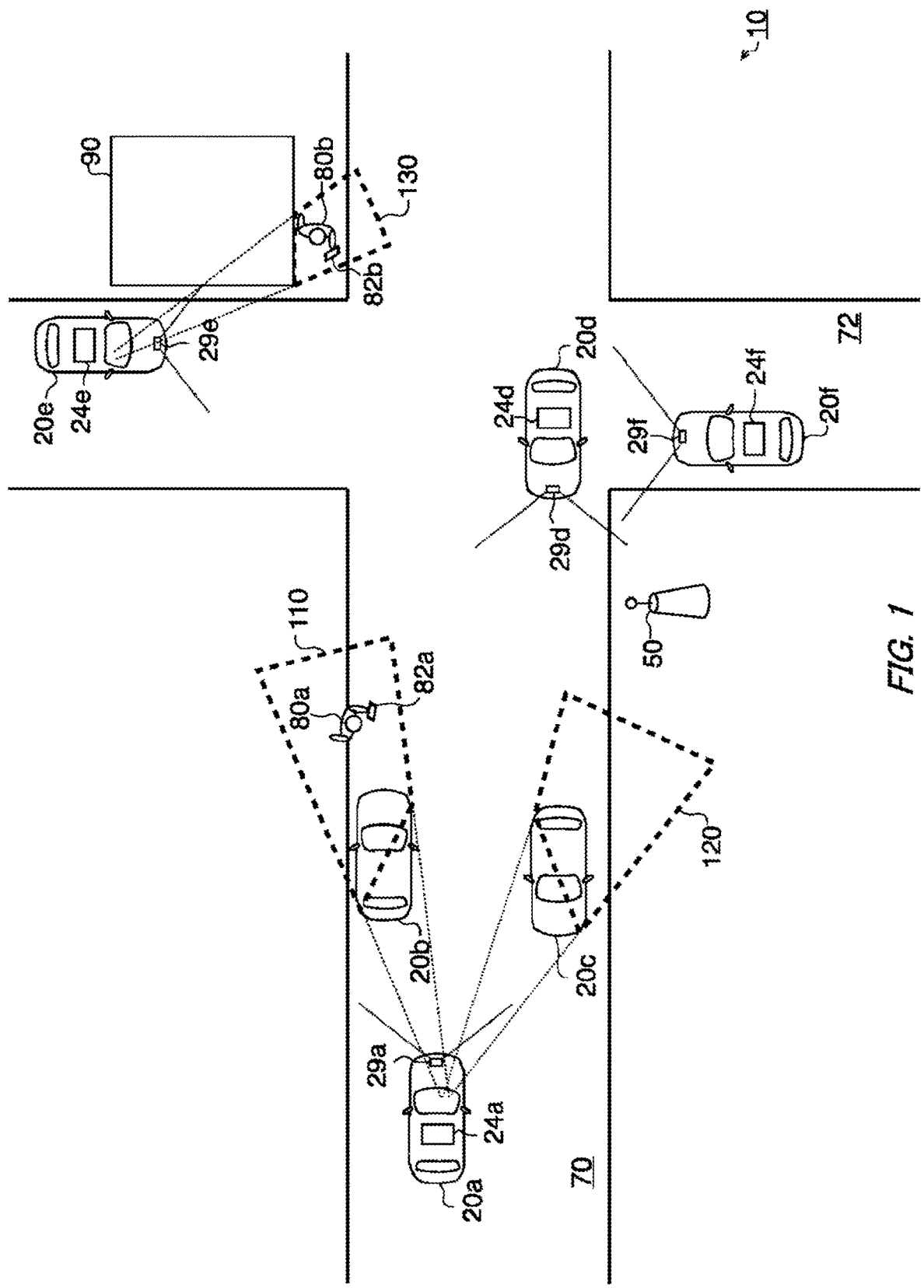
FIG. 1 schematically illustrates a usage scene of a warning system 10.

FIG. 1 schematically illustrates a usage scene of a warning system 10. The warning system 10 includes a vehicle 20*a*, a vehicle 20*b*, a vehicle 20*c*, a vehicle 20*d*, a vehicle 20*e*, and a vehicle 20*f*, and a terminal 82*a* and a terminal 82*b*.

According to the present embodiment, the vehicle 20*a*, the vehicle 20*b*, the vehicle 20*c*, the vehicle 20*d*, the vehicle 20*e*, and the vehicle 20*f* may be collectively referred to as the "vehicle 20". The vehicle 20 is one example of the "vehicle 20". In addition, the terminal 82*a* and the terminal 82*b* are terminals respectively possessed by a pedestrian 80*a* and a pedestrian 80*b*. According to the present embodiment, the pedestrian 80*a* and the pedestrian 80*b* may be collectively referred to as the "pedestrian 80". In addition, the terminals 82*a* and 82*b* may be collectively referred to as the "terminal 82".

The vehicle 20*a* includes a sensor 29*a* and an information processing apparatus 24*a*. The sensor 29*a* is configured by including a camera. The information processing apparatus 24*a* includes a processing function of information acquired by the sensor 29*a*, and a communication function. Note that according to the present embodiment, any of suffixes "a" to "f" of reference signs of the vehicles 20 is assigned to an end of a reference sign of the component included in the vehicle 20, so that the components (for example, the sensors 29 and the information processing apparatuses 24) are distinguished to be included in which of the vehicles 20.

In FIG. 1, the vehicle 20*a* is a vehicle traveling along a road 70. The vehicle 20*b* is a vehicle parked on the road 70. For the vehicle 20*a*, an area 110 in an advancing direction of the vehicle 20*a* relative to the parked vehicle 20*b* is an area where it is difficult to be visually recognized from a location of the vehicle 20*a*. In addition, the vehicle 20*c* is a vehicle traveling along an oncoming lane of the road 70 when viewed from the vehicle 20*a*. An area 120 towards the advancing direction of the vehicle 20*a* relative to the vehicle 20*c* is an area where it is difficult to be visually recognized from the location of the vehicle 20*a*. Therefore, the information processing apparatus 24*a* detects the area 110 and the area 120 that are not on a line of sight from the vehicle 20*a* as a risk area from an image in the advancing direction which is acquired by the sensor 29*a*. The information processing apparatus 24*a* transmits risk area information including location information of the areas 110 and 120 by wireless communication.

In FIG. 1, the vehicle 20*d* is an oncoming vehicle of the vehicle 20*a*, and is a vehicle traveling in a location where the area 110 and the area 120 can be visually recognized. When the risk area information transmitted from the vehicle 20*a* is received, an information processing apparatus 24*d* of the vehicle 20*d* judges whether a pedestrian is present in each of the area 110 and the area 120 from an image acquired by a sensor 29*d*. When it is detected that the pedestrian 80*a* is present in the area 110 from the image acquired by the sensor 29*d*, the information processing apparatus 24*d* transmits response information indicating the presence of the pedestrian in the area 110 to the vehicle 20*a* by the wireless communication. In addition, when it is detected that the pedestrian is absent in the area 120 from the image acquired by the sensor 29*d*, the information processing apparatus 24*d* transmits the response information indicating the absence of the pedestrian in the area 120 to the vehicle 20*a* by the wireless communication. In addition, when it is judged that a current location of the terminal 82*a* is within the area 110, the terminal 82*a* transmits the response information indicating the presence of the terminal 82*a* in the area 110 to the vehicle 20*a* by the wireless communication. In addition, the terminal 82*a* outputs warning information for the pedestrian 80*a*.

In the vehicle 20a, when the response information indicating the presence of the pedestrian in the area 110 is received from the vehicle 20d, the information processing apparatus 24a performs warning display. In addition, when the response information is received from the terminal 82a, the information processing apparatus 24a performs the warning display.

In addition, in FIG. 1, it is difficult to visually recognize an area 130 from a location of the vehicle 20e traveling on the road 72, for example, since a building 90 is an obstruction. For this reason, an information processing apparatus 24e of the vehicle 20e determines the area 130 as the risk area, and transmits the risk area information including the location information of the area 130 by the wireless communication.

In FIG. 1, the vehicle 20f is an oncoming vehicle of the vehicle 20e, and is a vehicle stopping in a location where the area 130 can be visually recognized. When the risk area information transmitted from the vehicle 20e is received, an information processing apparatus 24f of the vehicle 20f judges whether a pedestrian is present in the area 130 from an image acquired by a sensor 29f. When it is detected that the pedestrian 80b is present in the area 130 from the image acquired by the sensor 29f, the information processing apparatus 24f transmits the response information indicating the presence of pedestrian in the area 130 to the vehicle 20e by the wireless communication. In addition, when it is judged that a current location of the terminal 82b is within the area 130, the terminal 82b transmits the response information indicating the presence of the terminal 82b in the area 130 to the vehicle 20e by the wireless communication. In addition, the terminal 82b outputs the warning information for the pedestrian 80b.

In the vehicle 20e, when the response information indicating the presence of the pedestrian in the area 130 is received from the vehicle 20f, the information processing apparatus 24e performs the warning display. In addition, when the response information is received from the terminal 82b, the information processing apparatus 24e performs the warning display.

In this manner, the information processing apparatus 24 determines a non line of sight area corresponding to a blind corner from its own vehicle as the risk area, and transmits the risk area information including the location information of the risk area to another vehicle by the wireless communication. When the risk area information is received, the other vehicle judges whether a pedestrian is present in the risk area, and transmits the response information indicating the presence of the pedestrian in the risk area by the wireless communication. In addition, when its own terminal is present in the risk area, the terminal 82 transmits the response information by the wireless communication. When the response information from the terminal 82 of the pedestrian or the other vehicle is received, the information processing apparatus 24 performs the warning display for an occupant of the vehicle 20. With this configuration, it is possible to appropriately perform a notification of the risk area cannot be recognized by the vehicle 20 or the pedestrian 80. The risk area is a recognition of a state related to an external environment recognized by the vehicle 20 or the information processing apparatus 24. The risk area may be, for example, an area where there is a risk for the pedestrian 80 or the vehicle 20. The risk area may be, for example, an area where a safety check is to be performed for the pedestrian 80 or the vehicle 20.

Note that communication between the information processing apparatus 24 and the terminal 82, and the information processing apparatus 24 of the other vehicle 20 is executed by direct communication. For example, a communication apparatus 290 performs the direct communication with the terminal 82 and the information processing apparatus 24 of the other vehicle 20 by short distance direct communication in Cellular-V2X. Examples of the short distance direct communication in Cellular-V2X include a communication system such as LTE-V2X PC5 or 5G-V2X PC5 (according to the present embodiment, which will be abbreviated as "PC5"). A mode using Wi-Fi (registered trademark) or dedicated short range communications (DSRC) may be adopted as the direct communication. The information processing apparatus 24 may perform the direct communication via a base station 50 such as an MEC server. Any direct communication system such as Bluetooth (registered trademark) other than Cellular-V2X or DSRC (registered trademark) may be adopted as the direct communication. The information processing apparatus 24 may perform the direct communication with the terminal 82 and the information processing apparatus 24 of the other vehicle 20 using a communication infrastructure included in intelligent transport systems (ITS).

Note that according to the present embodiment, for ease of the description, a case will be considered where it is judged on whether a pedestrian is present in a risk area. The pedestrian refers to a person who can make a passage on a road by a method without relying on a vehicle. The pedestrian includes a person who makes a passage on a road using a wheel chair or the like. However, it may be judged on whether not only the pedestrian but also any movable object such as a person other than the pedestrian or another vehicle is present in the risk area. The person other than the pedestrian may include a person aboard a stopped vehicle.

Figure 2:
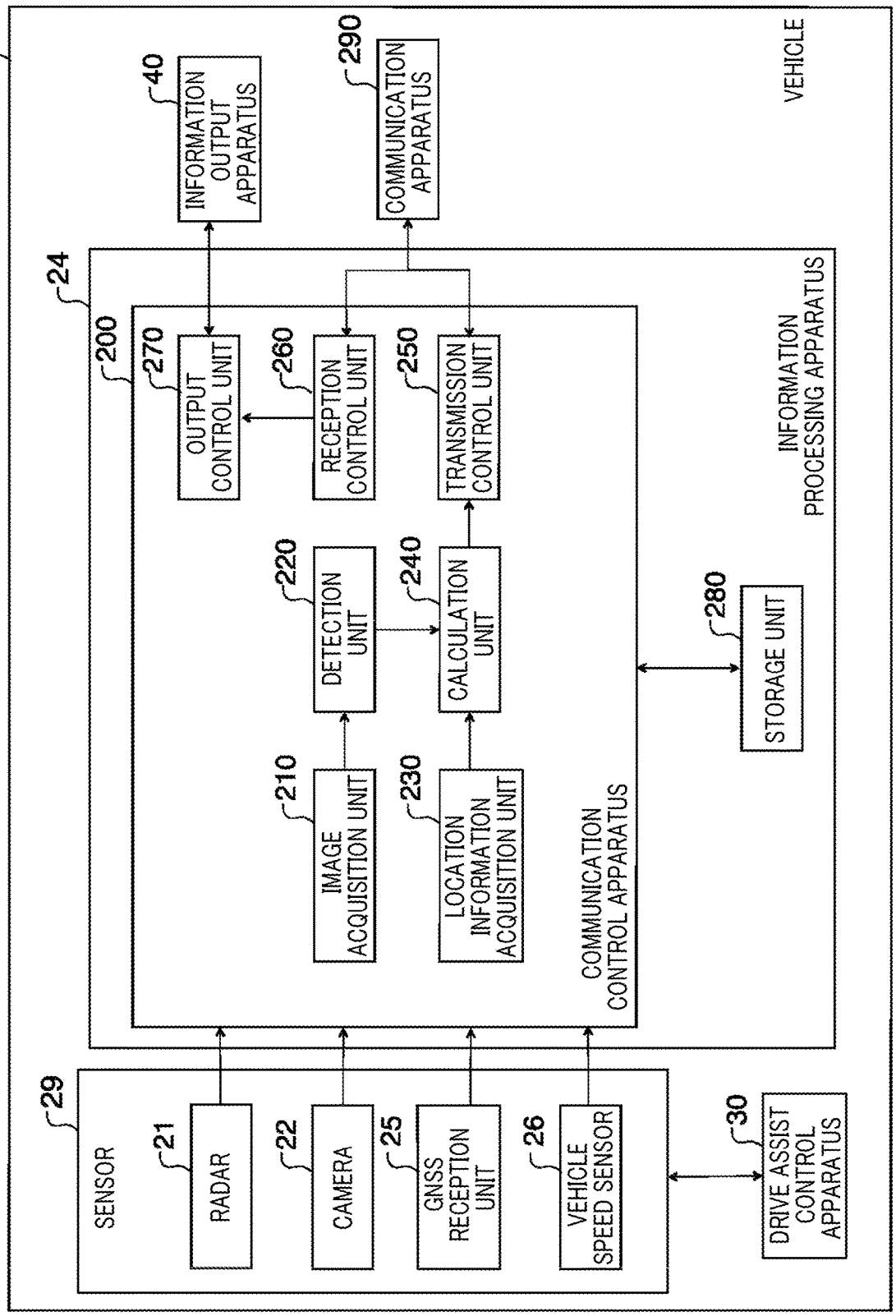
FIG. 2 illustrates a system configuration of a vehicle 20.

FIG. 2 illustrates a system configuration of the vehicle 20. The vehicle 20 includes the sensor 29, a drive assist control apparatus 30, the information processing apparatus 24, the communication apparatus 290, and an information output apparatus 40.

The sensor 29 includes a radar 21, a camera 22, a GNSS reception unit 25, and a vehicle speed sensor 26. The radar 21 may be a LiDAR, a millimeter wave radar, or the like. The GNSS reception unit 25 is configured to receive radio waves transmitted from a GNSS satellite. The GNSS reception unit 25 generates information indicating a current location of the vehicle 20 based on a signal received from the GNSS satellite. The camera 22 is configured to generate image information by capturing an image of a surrounding of the vehicle 20. For example, the camera 22 generates the image information by capturing an image in the advancing direction of the vehicle 20. The camera 22 may be a single-lens camera. The camera 22 may be a multi-lens camera, and may be a camera that acquires distance information to an object. Note that the sensor 29 may include a location sensor such as an odometer, or an inertial measurement unit (IMU) such as an acceleration sensor or an orientation sensor.

The drive assist control apparatus 30 is configured to perform drive assist of the vehicle 20 using information detected by the sensor 29. The drive assist control apparatus 30 may be achieved by an ECU having a function of advanced driver-assistance systems (ADAS).

The information output apparatus 40 is an apparatus configured to output the warning information. The information output apparatus 40 may have a function of a human machine interface (HMI). The information output apparatus 40 may include a head-up display or a navigation system. The information output apparatus 40 may be a mobile terminal possessed by an occupant of the vehicle 20. The information output apparatus 40 may be a sound output apparatus configured to output the warning information using a sound.

The communication apparatus 290 plays a role of performing the direct communication between the terminal 82 and the other vehicle 20. For example, the communication apparatus 290 plays a role of performing the wireless communication based on PC5.

The information processing apparatus 24 includes a communication control apparatus 200 and a storage unit 280. The communication control apparatus 200 is achieved, for example, by an arithmetic processing apparatus including a processor. The storage unit 280 is achieved by including a nonvolatile storage medium. The communication control apparatus 200 performs processing using information stored in the storage unit 280. The communication control apparatus 200 may be achieved by an electronic control unit (ECU) including a microcomputer provided with a CPU, a ROM, a RAM, an I/O, a bus, and the like.

The communication control apparatus 200 includes an image acquisition unit 210, a detection unit 220, a location information acquisition unit 230, a calculation unit 240, a transmission control unit 250, a reception control unit 260, and an output control unit 270.

The location information acquisition unit 230 is configured to acquire the location information of the vehicle 20. For example, the location information acquisition unit 230 acquires the location information of the vehicle 20 from the GNSS reception unit 25. The image acquisition unit 210 is configured to acquire an image of an outside of the vehicle 20. Specifically, the image acquisition unit 210 acquires an image captured by the camera 22 installed in the vehicle 20.

The detection unit 220 is configured to detect a risk area from the image. For example, the detection unit 220 detects, as the risk area, an area where a space exists which is not captured due to an external environment in an angle of view of the camera 22 from the image acquired from the image capturing unit. The detection unit 220 may detect an area (non line of sight area) where occlusion is generated due to shielding by an object as the risk area. Note that the detection unit 220 may decide a range of the risk area based on a vehicle speed of the vehicle 20 which is acquired by the vehicle speed sensor 26. For example, the detection unit 220 may detect a larger risk area as a vehicle speed of the vehicle 20 is higher.

The calculation unit 240 is configured to calculate location information of the risk area. The location information of the risk area may be location information representing a geographic location. The location information may be a plurality of pieces of coordinate information based on the risk area. For example, when the risk area has a quadrangle shape, the plurality of pieces of coordinate information may be coordinate information of vertices of the quadrangle. The location information may include the coordinate information based on the risk area and distance information from the coordinate information. For example, the location information may include coordinate information of a specific point of the risk area and distance information representing a size of the risk area using the point as a reference. The calculation unit 240 may calculate the location information of the risk area based on the location information of the vehicle 20. For example, the calculation unit 240 may calculate absolute location information of the risk area based on relative location information of the risk area to the current location of the vehicle 20 and the location information representing the geographic location acquired by the location information acquisition unit 230.

Note that when the detection unit 220 detects the non line of sight area as the risk area, the calculation unit 240 may acquire a distance to an object which is measured by the radar 21. The calculation unit 240 may acquire the distance to the object based on the image acquired by the image acquisition unit 210. The calculation unit 240 may acquire the distance to the object by performing statistical processing by fusing the image acquired by the image acquisition unit 210 and the distance to the object which is measured by the radar 21. The calculation unit 240 may calculate the relative location information of the risk area to the current location of the vehicle 20 based on the distance to the object.

The transmission control unit 250 is configured to control transmission of the risk area information including the location information. For example, the transmission control unit 250 causes the communication apparatus 290 to transmit the risk area information including the location information by the wireless communication. The transmission control unit 250 may control the transmission of the risk area information further including information indicating another movable object that is to transmit a response to the risk area information. The transmission control unit 250 may control the transmission of the risk area information including information indicating another movable object that is to detect whether the movable object is present in the risk area. The transmission control unit 250 may control the transmission of the risk area information including a condition that is to be satisfied by the other movable object that is to detect whether the movable object is present in the risk area. The communication apparatus 290 may transmit the risk area information by broadcast.

The reception control unit 260 is configured to control reception of the response to the risk area information. The reception control unit 260 controls the reception of the response indicating the presence of a notification target in the vicinity of the risk area.

For example, the reception control unit 260 controls the reception of the response from the other vehicle 20 that is present outside a region of the risk area. Specifically, the reception control unit 260 controls the reception of the response indicating the presence of the notification target in the vicinity of the risk area from the other vehicle 20 present outside the region of the risk area. In addition, the reception control unit 260 controls the reception of the response from another movable object that is present in the region of the risk area. Specifically, the reception control unit 260 controls the reception of the response indicating the presence of the notification target in the vicinity of the risk area from the terminal 82 present in the region of the risk area.

The output control unit 270 is configured to control output of notification information based on the response. For example, the output control unit 270 controls display of display information based on the response. When the response indicating the presence of the notification target in the vicinity of the risk area is received, the output control unit 270 outputs the notification information. For example, the output control unit 270 causes the information output apparatus 40 to output the warning information as one example of the notification information.

Figure 3:
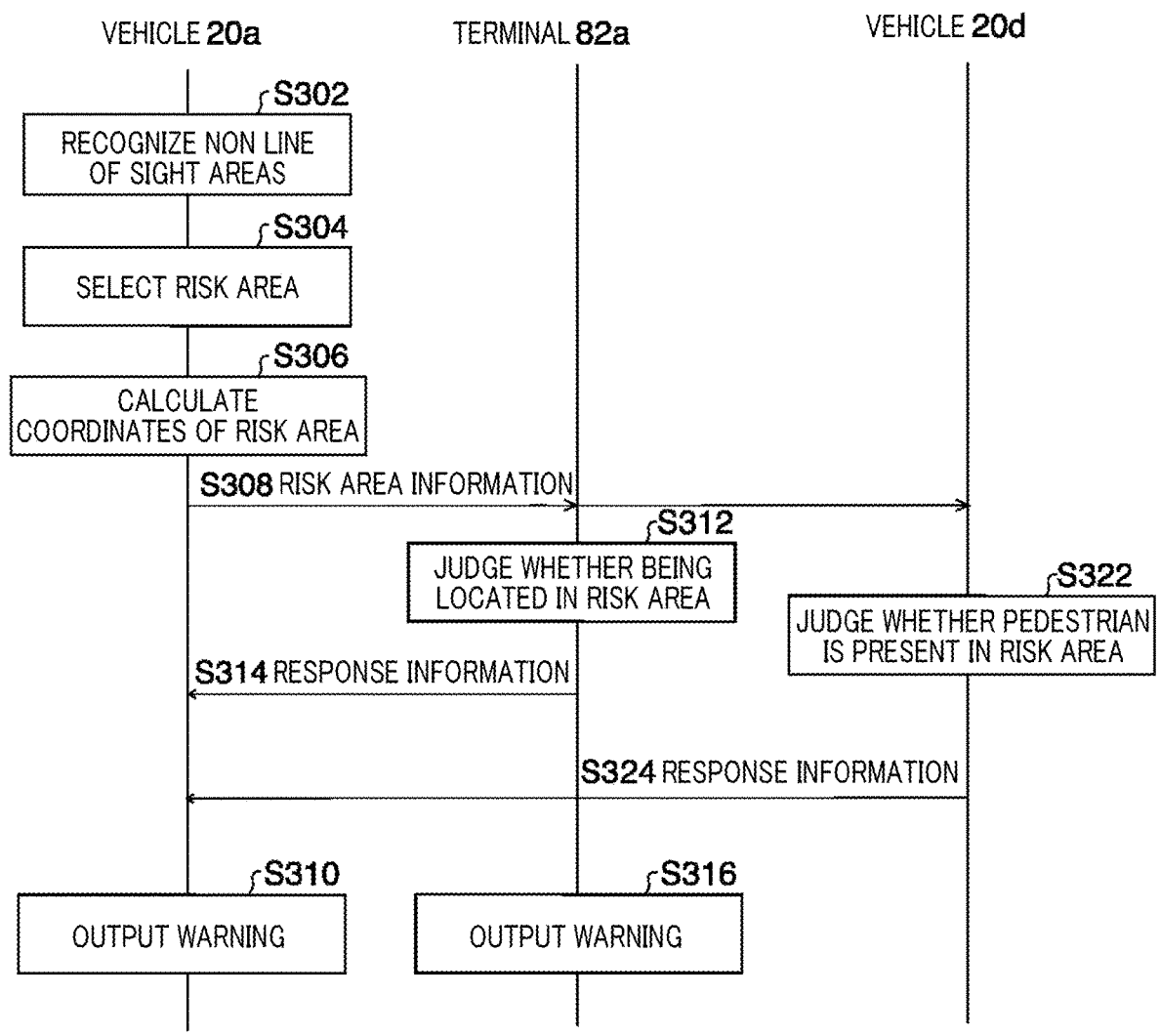
FIG. 3 schematically illustrates a flow of processing executed by a vehicle 20*a*, a terminal 82*a*, and a vehicle 20*d*.

FIG. 3 schematically illustrates a flow of processing executed by the vehicle 20a, the terminal 82a, and the vehicle 20d. FIG. 3 illustrates the flow of the processing when the vehicle 20a communicates with the terminal 82a and the vehicle 20d based on PC5.

In S302, the detection unit 220 recognizes non line of sight areas in the advancing direction of the vehicle 20a from the image acquired from the camera 22. In S304, the detection unit 220 selects the risk area from among the non line of sight areas recognized in S302. For example, the detection unit 220 selects, as the risk area, an area where the risk area information is not transmitted in a predetermined period of time previous to the present time among the non line of sight areas recognized in S302. The detection unit 220 selects, as the risk area, an area where the vehicle 20a reaches within a predetermined period of time among the non line of sight areas recognized in S302. For example, the detection unit 220 calculates a period of time required for arrival corresponding to a period of time until the vehicle 20a reaches a location in the vicinity of the non line of sight area based on a distance to the non line of sight area which is calculated from at least one of the image acquired from the camera 22 and the distance measured by the radar 21 and a vehicle speed measured by the vehicle speed sensor 26, and selects a line of sight area where the period of time required for arrival is within a predetermined period of time as the risk area.

In S306, the calculation unit 240 calculates the coordinate information of the risk area selected in S304. The calculation unit 240 calculates absolute coordinate information of the risk area selected in S304 based on the current location of the vehicle 20a and relative coordinates of the risk area using the vehicle 20a as the reference. The absolute coordinate information of the risk area may be geographic coordinates of the risk area. The absolute coordinate information of the risk area may include latitude information and longitude information of the risk area.

In S308, the transmission control unit 250 transmits the risk area information. The risk area information may include an area ID, the coordinate information of the risk area, transmission source information of the risk area information, and the period of time required for arrival. The area ID is identification information for uniquely specifying the risk area selected in S304

The area ID may be identification information decided by the information processing apparatus 24a. The transmission source information is identification information for uniquely specifying the vehicle 20a corresponding to a transmission source of the risk area information.

In S312, when the risk area information transmitted from the vehicle 20a is received, the terminal 82a determines whether the terminal 82a is located in the risk area. For example, the terminal 82a determines whether coordinates of the current location of the terminal 82a are in a region set by the coordinate information included in the risk area information. When the terminal 82a is located in the risk area, in S314, the response information indicating the presence of the pedestrian in the risk area is transmitted to the vehicle 20a. The terminal 82a includes, in the response information, the area ID included in the risk area information received by the terminal 82a and a terminal ID for uniquely identifying the terminal 82a, and transmits the response information. In addition, in S316, the terminal 82a performs warning to the pedestrian 80a by the human machine interface (HMI) function of the terminal 82a. Note that in S312, when it is judged that the terminal 82a is not located in the risk area, the terminal 82a discards the received risk area information, does not transmit the response information, and does not output the warning.

In S322, when the risk area information transmitted from the vehicle 20a is received, the information processing apparatus 24d of the vehicle 20d determines whether a pedestrian is present in the risk area. For example, the information processing apparatus 24d judges whether a pedestrian is present in a region set by the coordinate information included in the risk area information based on the image acquired by the sensor 29d and the distance information. In S324, the information processing apparatus 24d transmits the response information to the vehicle 20a. The information processing apparatus 24d includes, in the response information, the area ID included in the received risk area information, the terminal ID for uniquely identifying the vehicle 20d, and presence information indicating whether a pedestrian is present in the risk area, and transmits the response information.

In S310, when the response information transmitted from the terminal 82a is received, the output control unit 270 causes the warning information to be output based on the HMI function of the information output apparatus 40. In addition, when the response information received from the vehicle 20d includes the presence information indicating the presence of the pedestrian in the risk area, the output control unit 270 causes the warning information to be output based on the HMI function of the information output apparatus 40.

Figure 4:
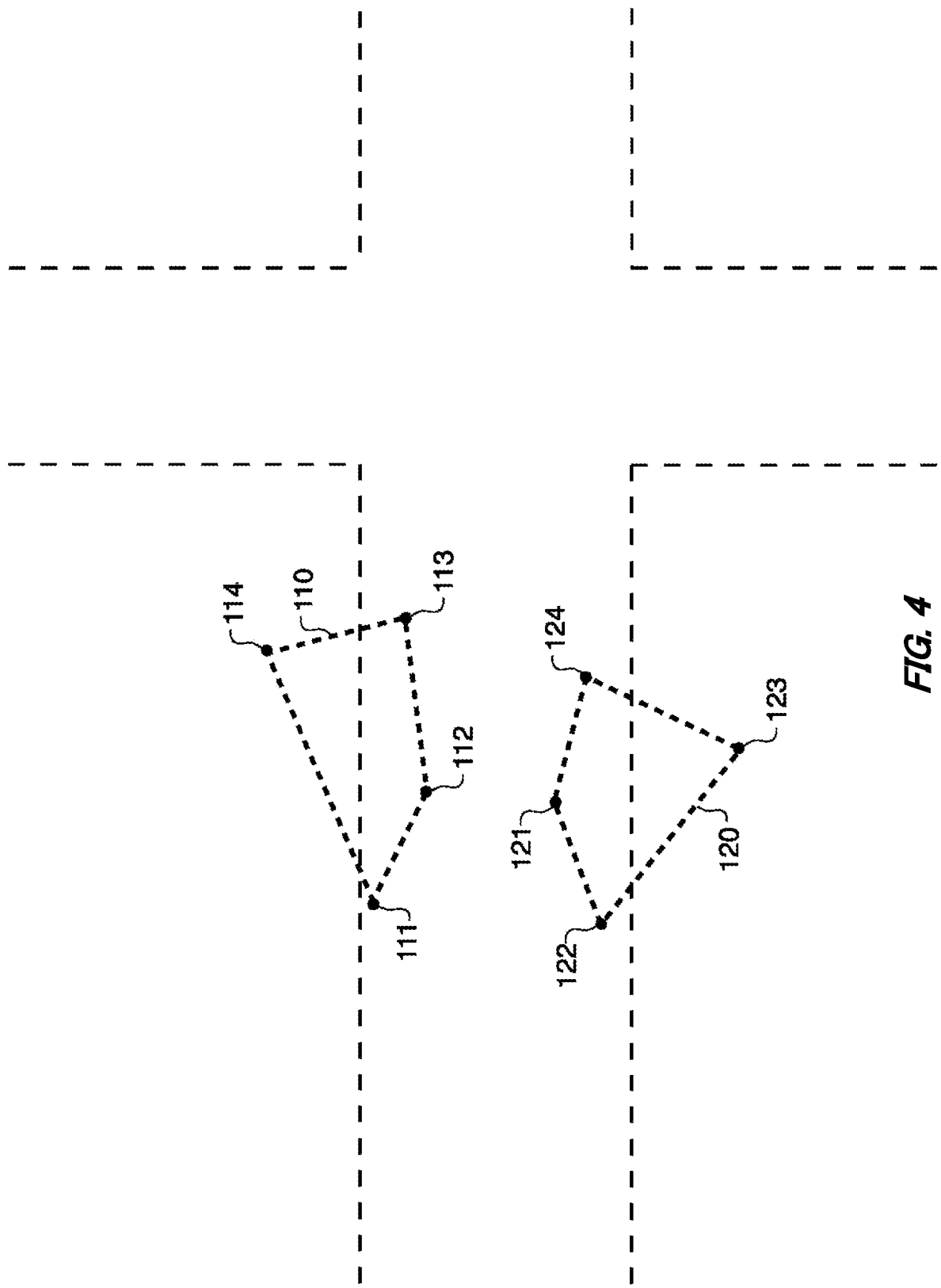
FIG. 4 conceptually illustrates location information of a risk area to be managed.

FIG. 4 conceptually illustrates the location information of the risk area to be managed. In the vehicle 20a, the calculation unit 240 calculates coordinates of each of four points including a point 111, a point 112, a point 113, and a point 114 which represent an outline of the area 110 judged as the risk area. The area 110 is a closed region formed by linking the coordinates of the point 111, the point 112, the point 113, and the point 114. In addition, the calculation unit 240 calculates coordinates of each of four points including a point 121, a point 122, a point 123, and a point 124 which represent an outline of the area 120 judged as the risk area. The area 120 is a closed region formed by linking the coordinates of the point 121, the point 122, the point 123, and the point 124. A storage unit 180 stores the coordinates of each of the point 111, the point 112, the point 113, and the point 114 while being associated with the area ID assigned to the area 110. In addition, the storage unit 180 stores the coordinates of each of the point 121, the point 122, the point 123, and the point 124 while being associated with the area ID assigned to the area 120.

When the other vehicle 20 receives the risk area information, the information processing apparatus 24 of the other vehicle 20 analyzes an image region where an area surrounded by the four points indicated by the coordinates included in the location information is captured from the image acquired by the sensor 29, and detects a pedestrian in the area. The information processing apparatus 24 transmits the response information including a detection result of the pedestrian in the area surrounded by the four points and the area ID to the vehicle 20 corresponding to the transmission source of the risk area information. In addition, when the terminal 82 receives the risk area information, the terminal 82 judges whether the current location of the terminal 82 is included in the area surrounded by the four points indicated by the coordinates included in the location information. When the current location of the terminal 82 is included in the area surrounded by the four points, the terminal 82a transmits the response information including the area ID to the vehicle 20 corresponding to the transmission source of the risk area information.

Note that when the risk area has a circular shape, the location information of the risk area may include coordinate information of a central point of the risk area and diameter information of the risk area. When the risk area has a polygonal shape, the location information of the risk area may include coordinate information of a point serving as a reference of the polygonal shape and length information of sides such as a width and a height of the risk area. When the risk area has an elliptical shape, the location information of the risk area may include coordinate information of a central point of the risk area, a major axis, a minor axis, and azimuth angle information.

Figure 5:
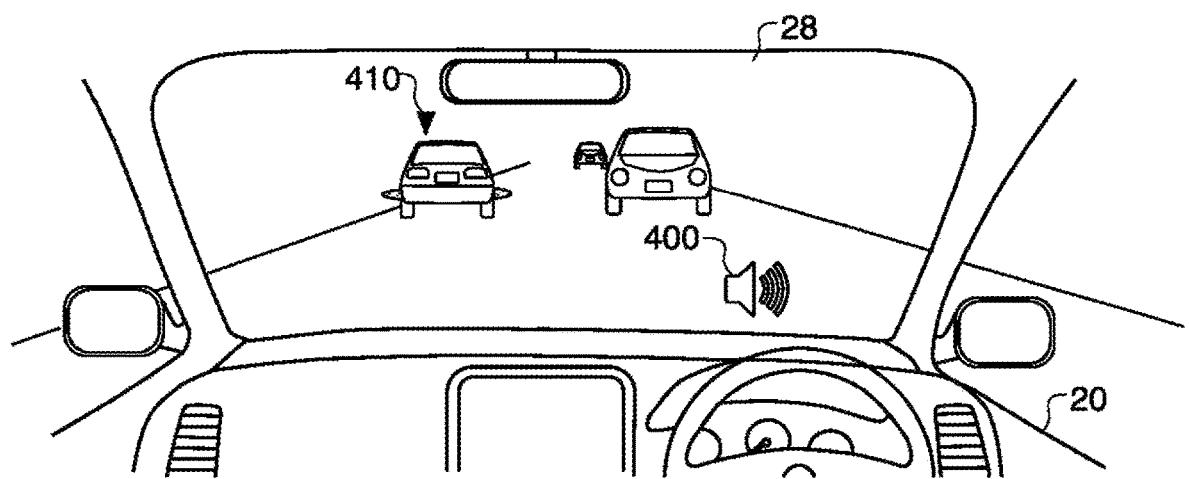
FIG. 5 illustrates one example of a display method of warning information in the vehicle 20.

FIG. 5 illustrates one example of a display method of the warning information in the vehicle 20. Herein, descriptions will be provided while the information output apparatus 40 includes a head-up display. When the response information received from the information processing apparatus 24d includes the presence information indicating the presence of the pedestrian in the risk area, the output control unit 270 judges an area corresponding to the area ID included in the response information as the risk area of the notification target. In addition, when the response information is received from the terminal 82a, the output control unit 270 judges the area corresponding to the area ID included in the response information as the risk area of the notification target.

The output control unit 270 causes the information output apparatus 40 to project light for forming a mark 400 as the warning information indicating the presence of the pedestrian in the risk area. In addition, the output control unit 270 causes the information output apparatus 40 to output light for forming a mark 410 in a display region corresponding to the location of the risk area of notification target. The mark 410 is an object indicating the location of the risk area. The information output apparatus 40 projects the light for forming the mark 400 and the mark 410 towards a reflection member disposed on a wind shield 28 of the vehicle 20. Note that the information output apparatus 40 may output the warning information using a sound or a character.

Figure 6:
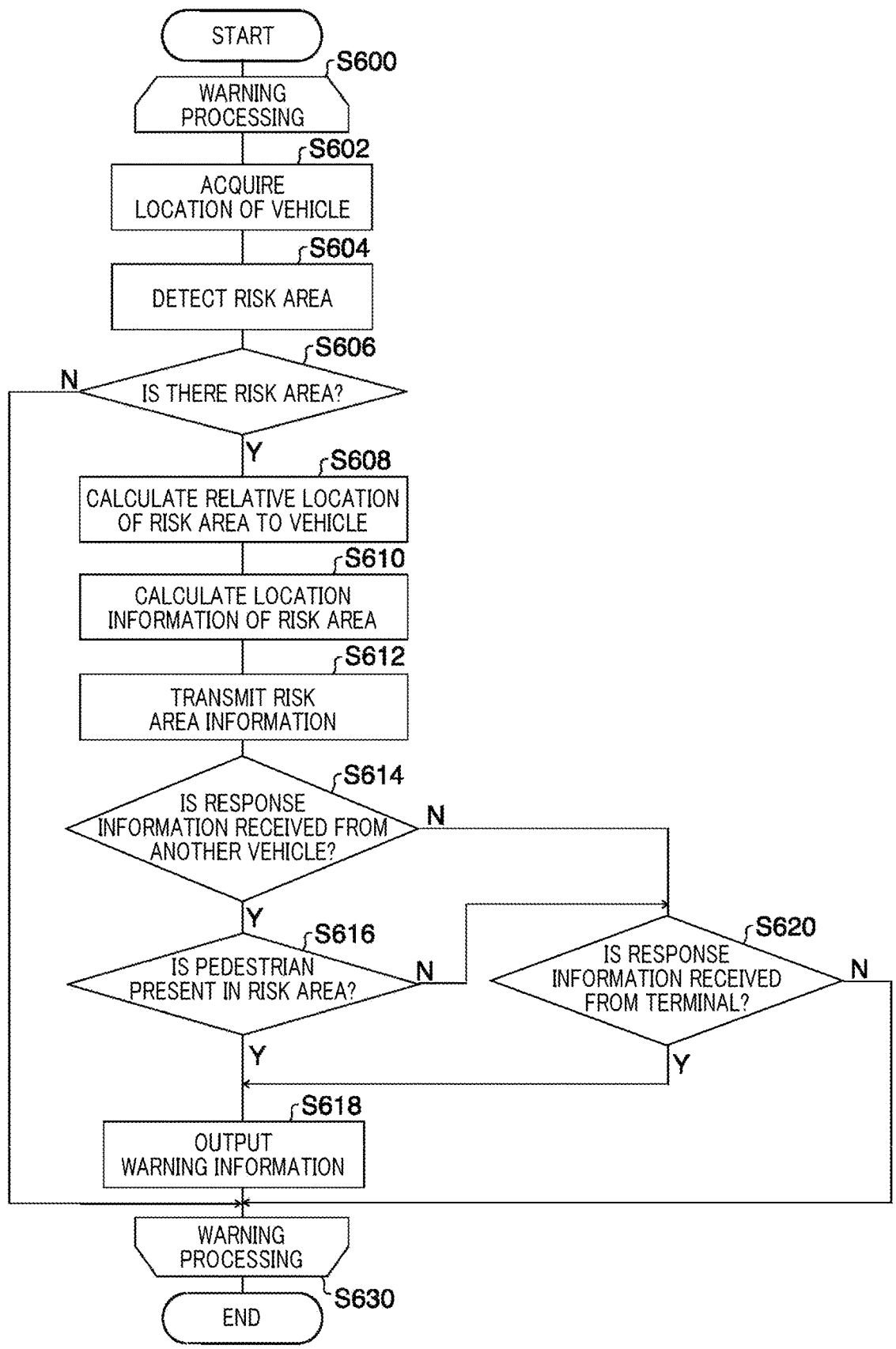
FIG. 6 illustrates a flowchart related to an information processing method executed by an information processing apparatus 24.

FIG. 6 illustrates a flowchart related to an information processing method executed by the information processing apparatus 24. The information processing apparatus 24 repeatedly executes processing from a start point S600 of a loop of warning processing to an end point S630 of the loop of the warning processing. When a predetermined condition is satisfied in at least one of the start point S600 of the warning processing and the end point S630 of the warning processing, the information processing apparatus 24 ends the loop of the warning processing.

In S602, the location information acquisition unit 230 acquires the location information acquired by the GNSS reception unit 25 as the current location of the vehicle 20. In S604, the detection unit 220 detects the risk area. For example, the detection unit 220 may detect the risk area based on object information extracted from the image acquired by the camera 22 and object information acquired by the radar 21. The detection unit 220 may also detect the risk area based on location information of a building which is included in map information, the current location of the vehicle 20, and orientation information of the vehicle 20.

In S606, it is judged on whether the risk area is detected. When the risk area is not detected, the flow shifts to the processing in S630. When the risk area is detected, in S608, the calculation unit 240 calculates relative location of the risk area using the location of the vehicle 20 as the reference. In S610, the calculation unit 240 calculates the location information of the risk area. For example, the calculation unit 240 calculates the coordinate information of the risk area based on coordinate information of the relative location of the risk area which is calculated in S608 and coordinate information of the current location of the vehicle 20 which is detected in S602. In S612, the transmission control unit 250 causes the communication apparatus 290 to transmit the location information of the risk area which is calculated in S610 and the risk area information including the area ID.

Note that the transmission control unit 250 may include, in the risk area information, information indicating the other vehicle 20 that is to detect whether a pedestrian is present in the risk area. For example, there are some cases where an area is a risk area for a passenger vehicle, but the area is not a risk area for a vehicle with a high vehicle height such as a heavy duty truck or a bus traveling behind the passenger vehicle. For this reason, the transmission control unit 250 may include, in the risk area information, information for specifying a vehicle height or a type as a condition to be satisfied by the other vehicle 20 that detects whether a pedestrian is present in the risk area. In addition, the other vehicle 20 traveling in a direction intersecting with the advancing direction of the vehicle 20 is likely to be able to visibly recognize the risk area. For this reason, the transmission control unit 250 may include, in the risk area information, information for specifying the advancing direction of the vehicle as a condition to be satisfied by the other vehicle 20 that detects whether a pedestrian is present in the risk area. The transmission control unit 250 may include, in the risk area information, information for specifying a location of the vehicle as a condition to be satisfied by the other vehicle 20 that detects whether a pedestrian is present in the risk area. When the condition included in the risk area information is satisfied by its own vehicle, the other vehicle 20 that has received the risk area information may detect whether a pedestrian is present in the risk area and transmit the response information.

In S614, the reception control unit 260 judges whether the response information including the area ID is received from the other vehicle 20. When the response information is received, in S616, the output control unit 270 judges whether a pedestrian is present in the risk area based on the presence information included in the response information. When it is judged that the pedestrian is present in the risk area, in S618, the output control unit 270 causes the information output apparatus 40 to output the warning information.

In the judgement in S614, when the response information including the area ID is not received from the other vehicle 20, in S620, the output control unit 270 judges whether the response information including the area ID is received from the terminal 82. When the response information is received from the terminal 82, the flow shifts to the processing in S618. When the response information is not received from the terminal 82, the flow shifts to the processing in S630.

Note that in the embodiment described above, the mode has been described in which the vehicle 20 directly transmits the risk area information to the other vehicle 20 and the terminal 82. However, a mode can also be adopted in which the processing for judging whether the pedestrian is present in the risk area is performed via the base station 50. For example, when the risk area information is received, the base station 50 may select the terminal 82 corresponding to the transmission destination of the risk area information based on the location information included in the risk area information and the location information of the terminal 82 managed by the base station 50. When the response information is received from the terminal 82, the base station 50 may transmit the response information to the vehicle 20 corresponding to the transmission source of the risk area information. When it is judged that the terminal 82 is present in the risk area based on the location information included in the risk area information and the location information of the terminal 82 managed by the base station 50, the base station 50 may transmit the response information to the vehicle 20 corresponding to the transmission source of the risk area information. In addition, when the risk area information is received, the base station 50 may select the other vehicle 20 corresponding to the transmission destination of the risk area information based on the location information included in the risk area information and the location information of the other vehicle 20 managed by the base station 50. When the response information is received from the other vehicle 20, the base station 50 may transmit the response information to the vehicle 20 corresponding to the transmission source of the risk area information.

In accordance with the warning system 10 described above, when the location information of the non line of sight area for a certain vehicle 20 is transmitted, another vehicle 20 can judge whether a pedestrian is present in the non line of sight area for the certain vehicle 20. In addition, since it is found out that its own terminal is located in the non line of sight area of the vehicle 20, the terminal 82 can output the warning information to the pedestrian 80. With this configuration, traffic safety can be increased.

Note that the vehicle 20 is one example of transport equipment. The transport equipment includes a motor vehicle such as a passenger vehicle or a bus, a saddle type vehicle, a bicycle, or the like. In addition, the movable object includes, in addition to a person, transport equipment such as a motor vehicle like a passenger vehicle or a bus, a saddle type vehicle, or a bicycle.

Figure 7:
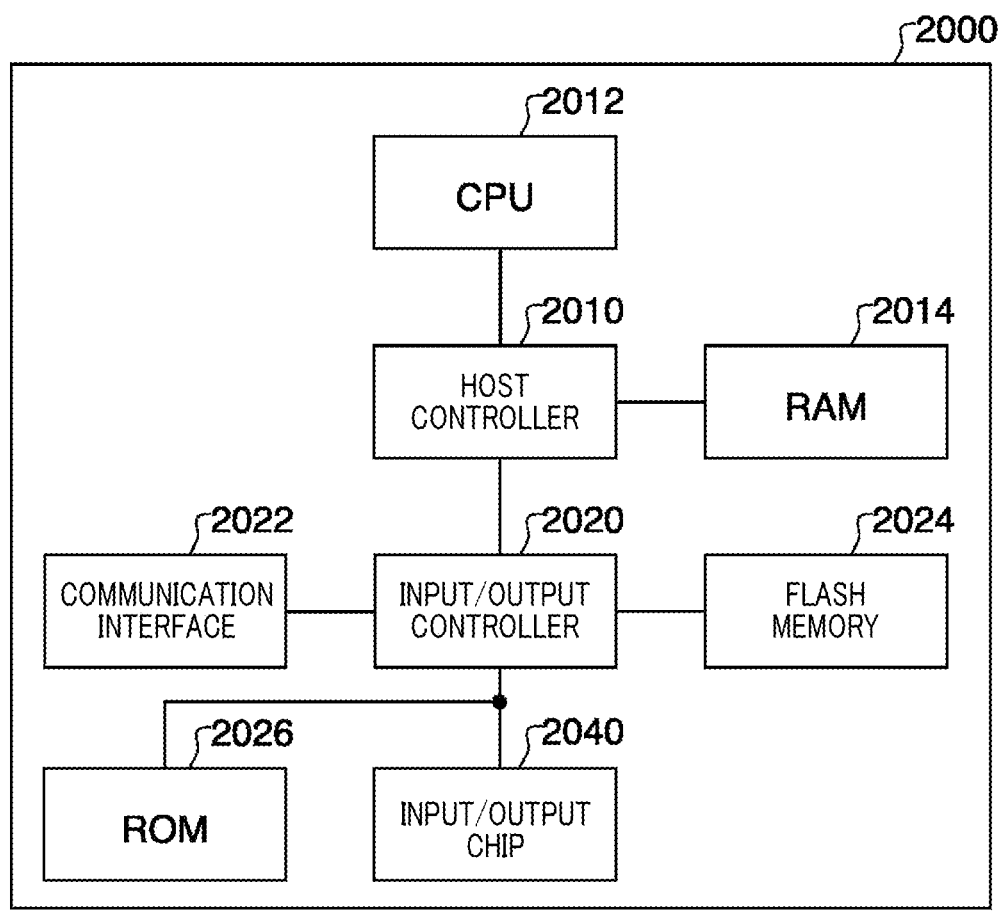
FIG. 7 illustrates an example of a computer 2000.

FIG. 7 illustrates an example of a computer 2000 where a plurality of embodiments of the present invention may be entirely or partially embodied. Programs installed in the computer 2000 can cause the computer 2000 to function as apparatuses such as the information processing apparatus 24 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in the present specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014, or the ROM 2026, and are executed by the CPU 2012. Information processing written in these programs is read by the computer 2000, and provides cooperation between the programs and the various types of hardware resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in the present specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of said plurality of entries, an entry with the attribute value of the first attribute specified that meets a condition, read the attribute value of the second attribute stored in said entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program installed in the computer 2000 and causing the computer 2000 to function as the information processing apparatus 24 may instruct the CPU 2012 or the like to cause the computer 2000 to function as each unit of the information processing apparatus 24. The information processing written in these programs are read by the computer 2000 to cause the computer to function as each unit of the information processing apparatus 24, which is specific means realized by the cooperation of software and the various types of hardware resources described above. Then, these specific means implement operations or processing of information according to the intended use of the computer 2000 in the present embodiment, so that the information processing apparatus 24 is constructed as a specific information processing apparatus according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 warning system
20 vehicle
21 radar
22 camera
24 information processing apparatus
25 GNSS reception unit
26 vehicle speed sensor
28 wind shield
29 sensor
30 drive assist control apparatus
40 information output apparatus
50 base station
70, 72 road
80 pedestrian
82 terminal
90 building
110, 120, 130 area
111, 112, 113, 114, 121, 122, 123, 124 point
180 storage unit
210 image acquisition unit
220 detection unit
230 location information acquisition unit
240 calculation unit
250 transmission control unit
260 reception control unit
270 output control unit
290 communication apparatus
2000 computer
2010 host controller
2012 CPU
2014 RAM
2020 input/output controller
2022 communication interface
2024 flash memory
2026 ROM
2040 input/output chip

What is claimed is:

1. A communication control apparatus comprising:
an image acquisition unit configured to acquire an image captured by an image capturing unit installed in a movable object;
a detection unit configured to detect a risk area from the image;
a calculation unit configured to calculate location information of the risk area;
a transmission control unit configured to control transmission of risk area information including the location information;
a reception control unit configured to control reception of a response to the risk area information; and
an output control unit configured to control output of notification information based on the response, wherein
the location information includes coordinate information based on the risk area.

2. The communication control apparatus according to claim 1, wherein
the location information further includes a plurality of pieces of additional coordinate information based on the risk area.

3. The communication control apparatus according to claim 1, wherein
the location information further includes distance information from the coordinate information.

4. The communication control apparatus according to claim 1, wherein
the reception control unit is configured to control the reception of the response indicating a presence of a notification target in a vicinity of the risk area.

5. The communication control apparatus according to claim 1, wherein
the reception control unit is configured to control the reception of the response from another movable object that is present outside a region of the risk area.

6. The communication control apparatus according to claim 5, wherein
the reception control unit is configured to control the reception of the response indicating a presence of a notification target in a vicinity of the risk area from the other movable object that is present outside the region of the risk area.

7. The communication control apparatus according to claim 1, wherein
the reception control unit is configured to control the reception of the response from another movable object that is present inside a region of the risk area.

8. The communication control apparatus according to claim 1, further comprising:
a location information acquisition unit configured to acquire location information of the movable object, wherein
the calculation unit is configured to calculate the location information of the risk area based on the location information of the movable object.

9. The communication control apparatus according to claim 4, wherein
when the response indicating the presence of the notification target in the vicinity of the risk area is received, the output control unit is configured to output the notification information.

10. The communication control apparatus according to claim 1, wherein
the detection unit is configured to detect, as the risk area, an area where a space exists which is not captured in an angle of view of the image capturing unit from the image acquired from the image capturing unit.

11. The communication control apparatus according to claim 1, wherein
the output control unit is configured to control display of display information by a display unit based on the response.

12. The communication control apparatus according to claim 1, wherein
the transmission control unit is configured to control the transmission of the risk area information further including information indicating another movable object that is to transmit a response to the risk area information.

13. The communication control apparatus according to claim 1, wherein
the movable object is a vehicle.

14. A vehicle comprising:
the communication control apparatus according to claim 13.

15. The communication control apparatus according to claim 2, wherein
the reception control unit is configured to control the reception of the response from another movable object that is present outside a region of the risk area.

16. The communication control apparatus according to claim 15, wherein
the reception control unit is configured to control the reception of the response indicating a presence of a notification target in a vicinity of the risk area from the other movable object that is present outside the region of the risk area.

17. The communication control apparatus according to claim 2, wherein
the reception control unit is configured to control the reception of the response from another movable object that is present inside a region of the risk area.

18. The communication control apparatus according to claim 2, further comprising:
a location information acquisition unit configured to acquire location information of the movable object, wherein
the calculation unit is configured to calculate the location information of the risk area based on the location information of the movable object.

19. A non-transitory computer-readable storage medium storing a program for causing a computer to function as:
an image acquisition unit configured to acquire an image captured by an image capturing unit installed in a movable object;
a detection unit configured to detect a risk area from the image;
a calculation unit configured to calculate location information of the risk area;
a transmission control unit configured to control transmission of risk area information including the location information;
a reception control unit configured to control reception of a response to the risk area information; and
an output control unit configured to control output of notification information based on the response, wherein
the location information includes coordinate information based on the risk area.

20. A communication control method comprising:
acquiring an image captured by an image capturing unit installed in a movable object;

detecting a risk area from the image;

calculating location information of the risk area;

controlling transmission of risk area information including the location information;

controlling reception of a response to the risk area information; and controlling output of notification information based on the response, wherein the location information includes coordinate information based on the risk area.

21. A communication control apparatus comprising:

an image acquisition unit configured to acquire an image captured by an image capturing unit installed in a movable object;

a detection unit configured to detect a risk area from the image;

a calculation unit configured to calculate location information of the risk area;

a transmission control unit configured to control transmission of risk area information including the location information;

a reception control unit configured to control reception of a response to the risk area information, the response being transmitted, via wireless communication, by an other movable object in communication with the movable object; and an output control unit configured to control output of notification information based on the response.

22. A non-transitory computer-readable storage medium storing a program for causing a computer to function as:

an image acquisition unit configured to acquire an image captured by an image capturing unit installed in a movable object;

a detection unit configured to detect a risk area from the image;

a calculation unit configured to calculate location information of the risk area;

a transmission control unit configured to control transmission of risk area information including the location information;

a reception control unit configured to control reception of a response to the risk area information, the response being transmitted, via wireless communication, by an other movable object in communication with the movable object; and an output control unit configured to control output of notification information based on the response.

23. A communication control method comprising:

acquiring an image captured by an image capturing unit installed in a movable object;

detecting a risk area from the image;

calculating location information of the risk area;

controlling transmission of risk area information including the location information;

controlling reception of a response to the risk area information, the response being transmitted, via wireless communication, by an other movable object in communication with the movable object; and controlling output of notification information based on the response.

* * * * *